United States Patent
Bogos et al.

(10) Patent No.: US 9,518,840 B2
(45) Date of Patent: *Dec. 13, 2016

(54) HIGH RESOLUTION NON-CONTACTING MULTI-TURN POSITION SENSOR

(71) Applicant: BOURNS, INC., Riverside, CA (US)

(72) Inventors: Eugen Bogos, Lake Elsinore, CA (US); Perry Wehlmann, Eastvale, CA (US); Thanh Vinh Nguyen, Riverside, CA (US)

(73) Assignee: Bourns, Inc., Riverside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,245

(22) Filed: Feb. 1, 2015

(65) Prior Publication Data

US 2015/0300839 A1  Oct. 22, 2015

Related U.S. Application Data

(63) Continuation of application No. 12/689,047, filed on Jan. 18, 2010, now Pat. No. 8,947,076.

(51) Int. Cl.
  *G01D 5/14* (2006.01)
  *G01B 7/14* (2006.01)

(52) U.S. Cl.
  CPC .................................. *G01D 5/14* (2013.01)

(58) Field of Classification Search
  CPC ............................................................. G01D 5/14
  USPC .......................... 324/207.24, 207.25, 207.26
  See application file for complete search history.

(56) References Cited

U.S. PATENT DOCUMENTS

| | | | |
|---|---|---|---|
| 3,777,273 A | 12/1973 | Baba et al. | |
| 4,037,219 A | 7/1977 | Lewis | |
| 4,146,174 A | 3/1979 | Darjany et al. | |
| 4,274,053 A | 6/1981 | Ito et al. | |

(Continued)

FOREIGN PATENT DOCUMENTS

| | | |
|---|---|---|
| CA | 1103357 | 6/1981 |
| CA | 1111566 | 10/1981 |

(Continued)

OTHER PUBLICATIONS

Japanese Office Action for JP Appl. No. 2011-006897, issued on Mar. 28, 2014.

(Continued)

*Primary Examiner* — Reena Aurora
(74) *Attorney, Agent, or Firm* — Chang & Hale LLP

(57) ABSTRACT

Disclosed are systems and methods for effectively sensing rotational position of an object. In certain embodiments, a rotational position sensor can include a shaft configured to couple with the rotating object. The shaft can be configured to couple with a magnet carrier such that rotation of the shaft yields translational motion of the carrier. A magnet mounted to the carrier also moves longitudinally with respect to the axis of the shaft, and relative to a magnetic field sensor configured to detect the magnet's longitudinal position. The detected longitudinal position can be in a range corresponding to a rotational range of the shaft, where the rotational range can be greater than one turn. In certain embodiments, the rotational position sensor can include a programmable capability to facilitate ease and flexibility in calibration and use in a wide range of applications.

20 Claims, 9 Drawing Sheets

(56) References Cited

U.S. PATENT DOCUMENTS

| | | | |
|---|---|---|---|
| 4,293,837 A | 10/1981 | Jaffe et al. | |
| 4,319,188 A | 3/1982 | Ito et al. | |
| 4,425,557 A | 1/1984 | Nakamura | |
| 4,445,112 A | 4/1984 | Haville | |
| 4,490,674 A | 12/1984 | Ito | |
| 4,841,246 A | 6/1989 | Juds et al. | |
| 4,893,131 A | 1/1990 | Smith et al. | |
| 4,914,389 A | 4/1990 | Juds | |
| 4,928,089 A | 5/1990 | Gasiunas et al. | |
| 4,942,394 A | 7/1990 | Gasiunas | |
| 5,444,369 A | 8/1995 | Luetzow | |
| 5,789,917 A | 8/1998 | Oudet et al. | |
| 5,955,881 A | 9/1999 | White et al. | |
| 6,018,241 A | 1/2000 | White et al. | |
| 6,411,082 B2 | 6/2002 | Glasson | |
| 6,496,003 B1 | 12/2002 | Okumura et al. | |
| 6,894,487 B2 | 5/2005 | Kunz-Vizenetz | |
| 7,024,946 B2 | 4/2006 | Nehl et al. | |
| 7,317,313 B2 | 1/2008 | Carlson et al. | |
| 7,443,160 B2 | 10/2008 | Wolf | |
| 7,498,914 B2 | 3/2009 | Miyashita et al. | |
| 7,557,340 B2 | 7/2009 | Wong et al. | |
| 7,567,284 B2 | 7/2009 | Ikemachi et al. | |
| 7,570,047 B2 | 8/2009 | Stuve et al. | |
| 7,586,283 B2 | 9/2009 | Kabashima et al. | |
| 7,589,522 B2 | 9/2009 | Knecht et al. | |
| 7,592,798 B2 | 9/2009 | Yabe et al. | |
| 7,595,635 B2 | 9/2009 | Uemura et al. | |
| 8,947,076 B2 * | 2/2015 | Bogos et al. | 324/207.25 |
| 2001/0033160 A1 | 10/2001 | Glasson | |
| 2005/0127901 A1 | 6/2005 | Johnson | |
| 2006/0017430 A1 | 1/2006 | Hagan | |
| 2008/0012522 A1 | 1/2008 | Wiegers et al. | |
| 2008/0079423 A1 | 4/2008 | Wolf | |
| 2008/0174301 A1 | 7/2008 | Mattson | |
| 2009/0096444 A1 | 4/2009 | Kobayashi | |
| 2009/0140731 A1 | 6/2009 | Miyashita et al. | |
| 2009/0152452 A1 | 6/2009 | Lee et al. | |
| 2009/0153136 A1 | 6/2009 | Kobayashi | |

FOREIGN PATENT DOCUMENTS

| | | |
|---|---|---|
| CA | 1136240 | 11/1982 |
| CA | 1137189 | 12/1982 |
| CA | 1166713 | 5/1984 |
| CA | 1184306 | 3/1985 |
| CA | 1191925 | 8/1985 |
| CA | 1248197 | 1/1989 |
| CA | 1256529 | 6/1989 |
| CA | 1261030 | 9/1989 |
| CA | 1261425 | 9/1989 |
| CA | 1262269 | 10/1989 |
| CA | 1270921 | 6/1990 |
| CA | 1295709 | 2/1992 |
| CA | 1302543 | 6/1992 |
| CA | 1305766 | 7/1992 |
| CA | 1318399 | 5/1993 |
| CA | 1321320 | 8/1993 |
| CA | 2728306 | 7/2011 |
| EP | 0325787 A2 | 8/1989 |
| EP | 1076225 A2 | 2/2001 |
| EP | 2095078 A2 | 9/2009 |
| EP | 2365290 A2 | 9/2011 |
| JP | 58086405 A | 5/1983 |
| JP | 2001183166 A | 7/2001 |
| JP | 09014509 | 1/2009 |
| JP | 09019741 | 1/2009 |
| JP | 09025111 | 2/2009 |
| JP | 09031290 | 2/2009 |
| JP | 09041986 | 2/2009 |
| JP | 09050127 | 3/2009 |
| JP | 09053102 | 3/2009 |
| JP | 09058491 | 3/2009 |
| JP | 09063332 | 3/2009 |
| JP | 09063412 | 3/2009 |
| JP | 09074628 | 4/2009 |
| JP | 09079986 | 4/2009 |
| JP | 09085693 | 4/2009 |
| JP | 09092618 | 4/2009 |
| JP | 09121907 | 6/2009 |
| JP | 09121958 | 6/2009 |
| JP | 09128246 | 6/2009 |
| JP | 09128383 | 6/2009 |
| JP | 09139124 | 6/2009 |
| JP | 09139307 | 6/2009 |
| JP | 2011006897 | 8/2011 |
| WO | 0161274 A1 | 8/2001 |
| WO | 2008024606 A2 | 2/2008 |
| WO | 2008064760 A2 | 6/2008 |
| WO | 2009033452 A1 | 3/2009 |
| WO | 2009033127 A2 | 5/2009 |
| WO | 2009103870 A2 | 8/2009 |

OTHER PUBLICATIONS

Extended European Search Report for EP Appl. No. 11250047.5, issued on Jan. 29, 2014.

Melexis Microelectronic Integrated Systems Application Note for Magnets for MLX90333 Linear Position Sensor, 90333-LP-AO-041007 Rev 003, Oct. 2007, 13 pages.

Ellin, et al., "The design and application of rotary encoders", Sensor Review, 2008, pp. 150-158, vol. 28, No. 2, Emerald Group Publishing Ltd.

L. Teschler, "Here Comes Low-Power Encoders", Machine Design (http://www.machinedesign.com), Jan. 8, 2009, 4 pages.

R. Repas, "Optical Absolute-Position Linear Encoders," Machine Design (http://www.machinedesign.com), Jan. 8, 2009, 1 page.

"Timken Launches High-Resolution Magnetic Encoder for Motion Control Applications", http://www.timken.com/en-us/about/NewsRoom/Stories/Pages/HighResolutionMagneticEncoder.aspx, Sep. 24, 2009, 2 pages.

* cited by examiner

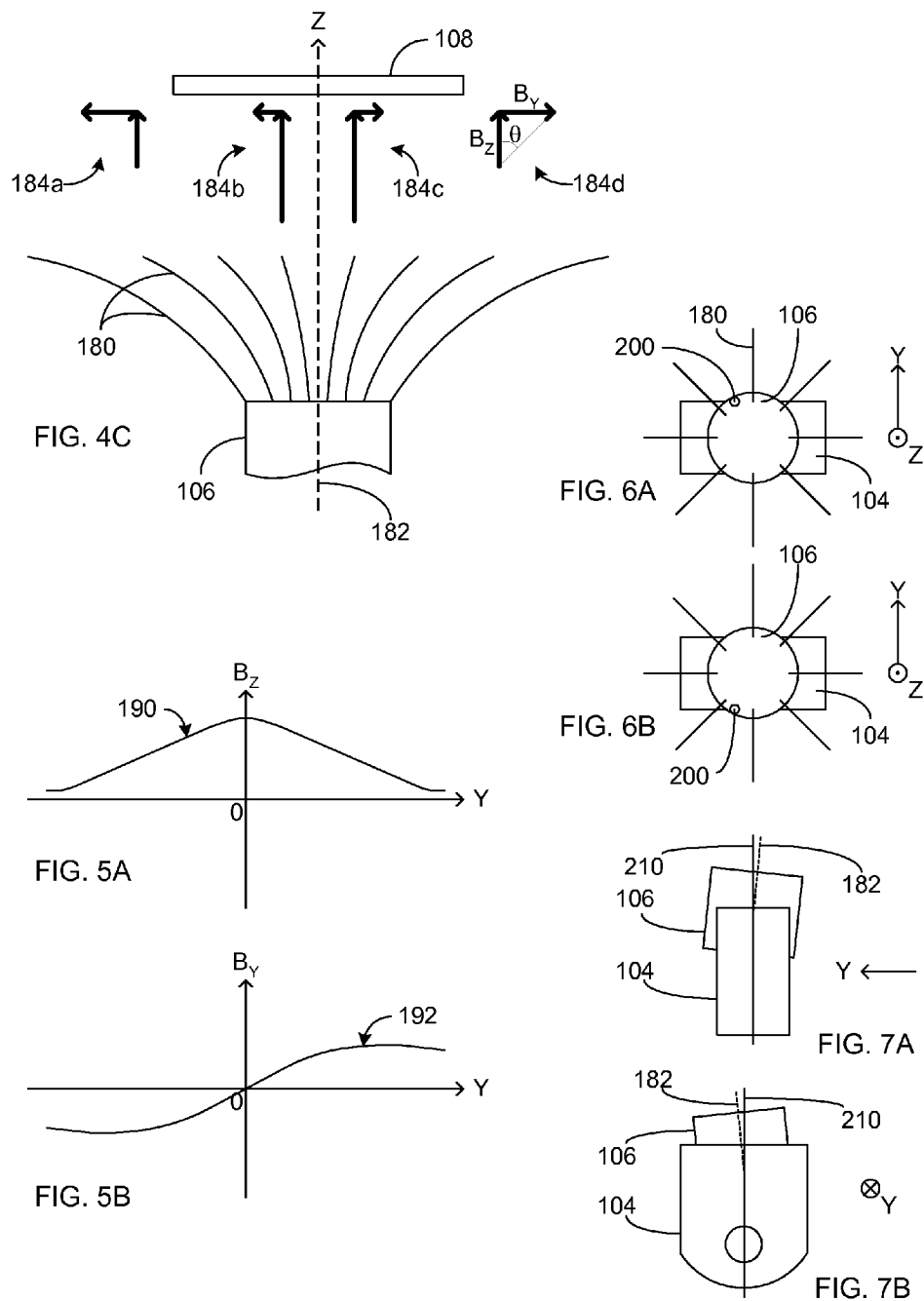

HIGH RESOLUTION NON-CONTACTING MULTI-TURN POSITION SENSOR

CROSS-REFERENCE TO RELATED APPLICATION(S)

This application is a continuation of U.S. application Ser. No. 12/689,047 filed Jan. 18, 2010 entitled HIGH RESOLUTION NON-CONTACTING MULTI-TURN POSITION SENSOR, the benefit of the filing date of which is hereby claimed, and the disclosure of which is hereby expressly incorporated by reference herein in its entirety.

BACKGROUND

Field of the Invention

The present disclosure generally relates to the field of sensors, and more particularly, to systems and methods for sensing angular position of an object such as a rotatable shaft.

Description of the Related Art

In many mechanical and/or electromechanical devices, it is desirable to accurately determine a state of a rotating object. For example, a rotating object such as a jackscrew imparts linear motion to another object by its rotation. In many situations, it is desirable to accurately determine the linearly moving object's location. Such determination can be based on knowing the angular position of the rotating object.

In some devices, angular position determination can be measured by an angular sensor. However, such angular sensors are either limited by one rotation (360 degrees) or have ambiguity in output when allowed to sense more than one turn of the rotating device.

SUMMARY

In certain embodiments, the present disclosure relates to a device having a housing. The device further includes a rotatable shaft having a longitudinal axis, wherein at least a portion of the shaft is within the housing. The device further includes a movable carrier disposed substantially within the housing and coupled to the shaft such that rotation of the shaft results in linear motion of the carrier along the longitudinal axis. The device further includes a magnet disposed on the carrier so as to move with the carrier such that a range of rotation of the shaft results in a range of linear motion of the magnet along the longitudinal axis. The magnet can be oriented such that the magnet's magnetization axis is substantially perpendicular to the longitudinal axis. The device further includes a magnetic sensor circuit disposed substantially within the housing, where the circuit is configured to uniquely determine position of the magnet anywhere within the range of linear motion of the magnet thereby allowing determination of rotational position of the shaft within the range of rotation.

In certain embodiments, the range of rotation of the shaft is greater than 360 degrees. In certain embodiments, the carrier is coupled to the shaft via matching threads formed on the carrier and the shaft. In certain embodiments, the matching threads are selected to provide the range of linear motion due to the range of rotation.

In certain embodiments, the magnetic sensor circuit comprises a Hall sensor assembly configured to measure flux density along the magnetization axis and flux density along the longitudinal axis. In certain embodiments, the range of linear motion of the magnet is selected so that measured flux density along the magnetization axis has a maximum value when the magnet's position is approximately at the middle of the range of linear motion. In certain embodiments, the magnet's longitudinal position ambiguity resulting from the measured flux density along the magnetization axis is resolved by directionality of the measured flux density along the longitudinal axis.

In certain embodiments, the magnetic sensor circuit is programmable so as to allow definition of an output range corresponding to a subset of the range of rotation of the shaft. In certain embodiments, the subset of the range of rotation comprises a rotation of the shaft by M degrees. M can be less than, equal to, or greater than 360 degrees. In certain embodiments, M is approximately equal to N times 360 degrees, N being a positive integer greater than 1.

In certain embodiments, an output signal within the output range has an approximately linear relationship with the rotational position of the shaft within the subset of the range of rotation of the shaft. In certain embodiments, the linear relationship is derived based on a plurality of known responses at rotational positions of the shaft within the subset of the range of rotation of the shaft.

In certain embodiments, the magnetic sensor circuit is configured to output a signal representative of the rotational position of the shaft. In certain embodiments, the magnetic sensor circuit comprises an analog-to-digital converter (ADC) such that the output signal comprises a digital signal. In certain embodiments, the resolution of the digital signal is selected based on a subset of the range of rotation of the shaft.

In certain embodiments, the device further includes a sleeve dimensioned to support the shaft and facilitate the shaft's rotation relative to the housing. In certain embodiments, the device further includes a shield configured to shield the magnetic sensor circuit from external electromagnetic influence. In certain embodiments, the shield is formed from a high magnetic permeability material.

In certain embodiments, the present disclosure relates to a multi-turn rotational position sensor having a rotatable shaft having a longitudinal axis. The sensor further includes a movable carrier coupled to the shaft such that rotation of the shaft results in linear motion of the carrier along the longitudinal axis. The sensor further includes a magnet disposed on the carrier so as to move with the carrier such that N rotations of the shaft results in a range of linear motion of the magnet along the longitudinal axis, with the quantity N being greater than 1. The sensor further includes a programmable integrated circuit configured to allow defining of the N rotations of the shaft as an operating range of the rotational position sensor. The programmable integrated circuit includes a magnetic sensor configured and oriented so as to measure at least two directional components of the magnet's field to allow determination of the magnet's longitudinal position relative to the magnetic sensor and thus the shaft's rotational position within the operating range.

In certain embodiments, the present disclosure relates to a method for calibrating a rotational position sensor having a magnet that moves linearly with respect to a magnetic field measurement device in response to rotation of a shaft of the rotational position sensor. The method includes selecting a range of rotation of the shaft. The method further includes determining a desired output response based on known magnetic field measurements for a plurality of linear positions of the magnet relative to the magnetic field measurement device, with the plurality of linear positions corresponding to rotational positions of the shaft within the range of rotation. The method further includes storing information representative of the desired output response, with the information allowing determination of a unique output for an input of magnetic field measurements at a given linear location of the magnet relative to the magnetic field measurement device.

In certain embodiments, the desired output response includes a response that is proportional to the rotational position of the shaft.

In certain embodiments, the present disclosure relates to a computer-readable medium containing machine-executable instructions that, if executed by an apparatus having one or more processors, causes the apparatus to perform operations including receiving an input of signals representative of magnetic field measurements resulting from a magnet in proximity to a sensor, with the magnet and the sensor configured such that the magnet is movable linearly relative to the sensor in response to a rotational motion of a shaft coupled to the magnet. The operations further include generating an output signal representative of a rotational position of the shaft, with the output signal determined by a desired output response that is based on calibration data representative of a plurality of known responses corresponding to shaft positions within a range of rotation. In certain embodiments, machine-executable instructions can be modified so as to change the range of rotation.

In certain embodiments, the present disclosure relates to a sensor for determining a rotational position of an object. The sensor includes a rotatable shaft having a longitudinal axis and configured to allow rotational coupling with the object. The sensor further includes a sensed assembly coupled to the shaft such that rotation of the shaft results in linear motion of the sensed assembly along the longitudinal axis. The sensor further includes a sensor assembly disposed relative to the sensed assembly so as to allow determination of longitudinal position of the sensed assembly at a plurality of locations along the longitudinal axis. The sensor further includes a housing configured to house at least some portions of the sensed assembly, the sensor assembly, and the rotatable shaft. The housing is configured to be mountable to a mounting structure, with the housing dimensioned to have a curved wall, and first and second substantially straight walls extending from the ends of the curved wall so as to define a U-shape.

In certain embodiments, the curved wall comprises a substantially semi-cylindrical wall about an axis that substantially coincides with the longitudinal axis of the shaft. In certain embodiments, the sensed assembly comprises a magnet mounted on a carrier. In certain embodiments, the carrier has a U-shaped profile dimensioned to be moveable within the U-shaped wall of the housing. In certain embodiments, the sensor assembly comprises a magnetic field sensor configured to detect the magnet.

In certain embodiments, the housing is dimensioned to be mountable to the mounting structure so as to provide a circular mounting functionality about the axis about the semi-cylindrical wall. In certain embodiments, the rotatable sensor is coupled to the housing so as to allow a range of rotation that is greater than one turn.

In certain embodiments, the housing further includes a cap wall disposed opposite from the curved wall. In certain embodiments, the cap wall can join the first and second substantially straight walls such that the cap wall is approximately perpendicular to the first and second substantially straight walls. In certain embodiments, the cap wall and the first and second substantially straight walls can form curved corners. In certain embodiments, the cap wall and the first and second substantially straight walls can form generally square corners.

In certain embodiments, the sensor further includes a shield configured to provide shielding to at least the sensor assembly from external field or radiation. In certain embodiments, the shield is configured to attenuate X-ray, gamma radiation, charged particle radiation, or neutrons. In certain embodiments, the sensor assembly is disposed within the upper portion of the U-shaped housing. In certain embodiments, the shield substantially conforms to the upper portion of the U-shaped housing so as to provide shielding effect for external field of radiation that is generally directional. In certain embodiments, the housing and the shield are configured such that the shield is readily removable.

In certain embodiments, the present disclosure relates to a rotational position sensor having a housing. The sensor further includes a rotatable shaft having a longitudinal axis, where at least a portion of the shaft is within the housing. The sensor further includes a movable carrier disposed substantially within the housing and coupled to the shaft such that rotation of the shaft results in linear motion of the carrier along the longitudinal axis. The sensor further includes a magnet disposed on the carrier so as to move with the carrier such that a range of rotation of the shaft results in a range of linear motion of the magnet along the longitudinal axis. The sensor further includes a magnetic sensor circuit disposed substantially within the housing. The circuit is configured to uniquely determine linear position of the magnet based on simultaneous detection of two or more components of magnetic field at the magnetic sensor circuit generated by the magnet, with the linear position determination allowing determination of rotational position of the shaft.

In certain embodiments, the magnet is disposed on the carrier such that the magnetic field at the magnetic sensor circuit defines an axis that is substantially perpendicular to the longitudinal axis. In certain embodiments, the magnet comprises a dipole magnet having north and south poles positioned along the axis.

In certain embodiments, the magnet comprises one or more dipole magnets. In certain embodiments, the magnet comprises a dipole magnet having north and south poles positioned along an axis that is substantially perpendicular to the longitudinal axis.

BRIEF DESCRIPTION OF THE DRAWINGS

FIG. 4C shows that in certain embodiments, the magnet can be oriented relative to its translational motion and the magnetic field detector such that its magnetic axis representative of the field pattern at or about the detector is generally perpendicular to the translational motion direction and generally normal to a plane defined by the magnetic field detector;

FIGS. 5A and 5B show example distributions of magnetic field strengths for the configuration of FIG. 4;

FIGS. 6A and 6B show that the example magnet orientation of FIG. 4 provides substantial symmetry of the magnet about its magnetic axis so as to reduce sensitivity in alignment of the magnet with respect to the magnetic field detector;

FIGS. 7A and 7B show that the example magnet orientation of FIG. 4 can also provide reduced sensitivity to misalignments of the magnet along lateral directions;

These and other aspects, advantages, and novel features of the present teachings will become apparent upon reading the following detailed description and upon reference to the accompanying drawings. In the drawings, similar elements have similar reference numerals.

DETAILED DESCRIPTION OF CERTAIN EMBODIMENTS

The present disclosure generally relates to a rotational position sensor. As described herein, one or more embodiments of the rotational position sensor can have advantageous features. For example, the sensor can be configured to provide a multi-turn input capability, and the number of turns for such an input can be selected and programmed. Accordingly, rotational position resolution of the sensor can be adjusted from relatively coarse resolution to relatively high or fine resolution. In another example, the sensor can be configured to provide such functionality with non-contacting arrangement between a sensing element and a sensed element. Accordingly, various mechanical issues typically associated with physically contacting configurations can be avoided.

In certain embodiments of the present disclosure, the rotational position sensor transforms rotational motion of a rotating object (such as a shaft) into a translational motion of a sensed element. A sensing element is provided and positioned relative to the sensed element so as to allow determination of the sensed element's translational position. In certain embodiments, such translational position of the sensed element corresponds to a unique rotational position of the shaft.

Figure 1:
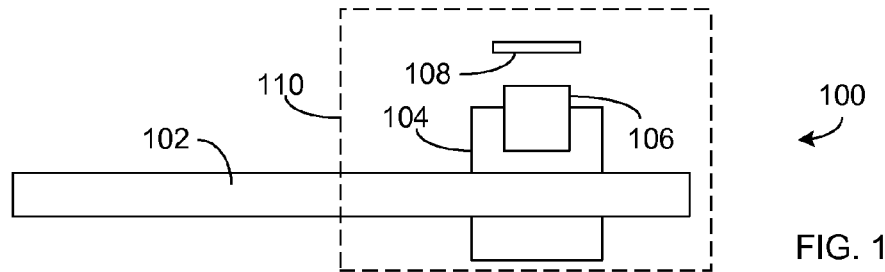
FIG. 1 schematically depicts an example embodiment of a rotational position sensor.

In certain embodiments, as shown in FIG. 1, a rotational position sensor 100 can include a rotating object such as a shaft 102 mechanically coupled to a carrier 104. The mechanical coupling can be configured so that rotation of the shaft 102 translates to translational motion of the carrier 104. In certain embodiments, such a translational motion of the carrier 104 can be a substantially linear motion along a direction substantially parallel to the rotational axis of the shaft 102.

In certain embodiments, the mechanical coupling between the shaft 102 and the carrier 104 can include matching screw threads formed on the shaft 102 and on the inner surface of an aperture defined by the carrier 104. Additional details of an example of such threaded coupling are described herein.

In certain embodiments, a lead value for the matching threads can be selected so as to provide a mechanical gear ratio between the rotation of the shaft 102 and the translation of the carrier 104. For the purpose of description herein, the term "pitch" may be used interchangeably with the term "lead" with an assumption that various example screw threads have single threadforms. It will be understood that one or more features of the present disclosure can also apply to screw threads having more than one threadforms. Thus, if appropriate in the description, distinctions between the two terms may be made.

As shown in FIG. 1, the rotational position sensor 100 further includes a magnet 106 disposed on the carrier 104 so as to be moveable with the carrier 104. Additional details about different orientations of the magnet 106 relative to the translational motion direction are described herein.

As shown in FIG. 1, the rotational position sensor 100 further includes a sensing element 108 configured to sense the magnet 106 at various locations along the translational motion direction. Additional details about the sensing element 108 are described herein.

In certain embodiments, the rotational position sensor 100 can also include a housing 110 to protect various components, facilitate mounting, etc. Additional details about the housing are described herein.

Figure 2A:
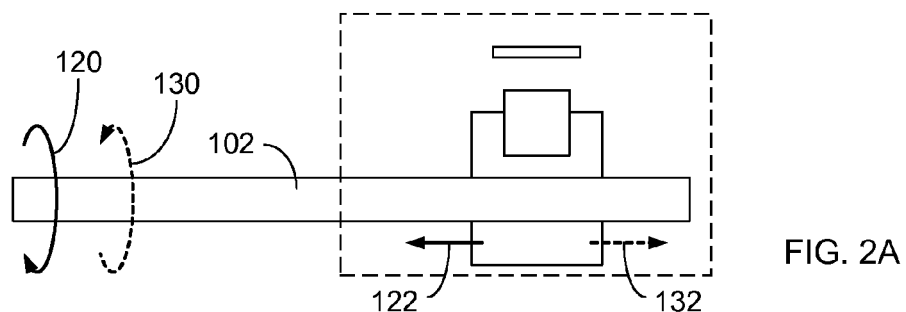
FIGS. 2A and 2B show that the rotational position sensor of FIG. 1 can be configured to mechanically transform an input rotational motion to a range of translational motion of a sensed element such as a magnet whose translational position can be detected by a sensing element such as a magnetic field detector.
Figure 2B:
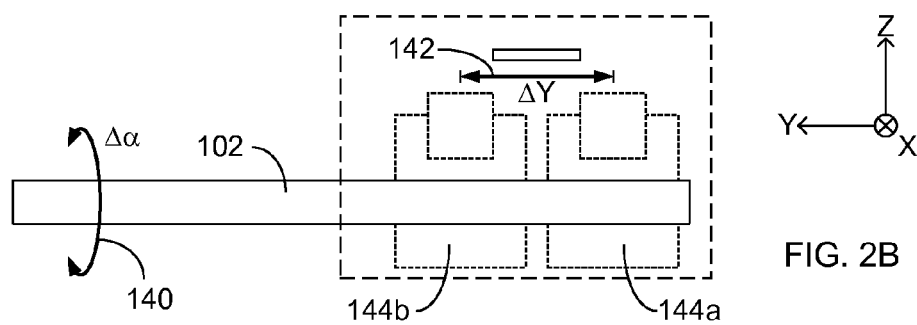

FIGS. 2A and 2B show that in certain embodiments, rotation of the shaft 102 in a first direction (arrow 120) results in the carrier 104 (and the magnet 106) moving linearly in a first direction (arrow 122), based on the mechanical gear ratio between the shaft 102 and the carrier 104. Rotation of the shaft in the opposite direction (arrow 130) results in the carrier 104 (and the magnet 106) moving linearly in a second direction (arrow 132) that is opposite the first linear direction 122.

Based on such coupling of the shaft and the carrier, a range ($\Delta\alpha$) of rotational motion (indicated by arrow 140) of the shaft 102 can be made to correspond to a range ($\Delta Y$, indicated by arrow 142) of linear motion of the magnet 106 defined by two end positions (144a, 144b) of the carrier 104. In certain embodiments, the linear motion of the carrier 104 and/or the magnet 106 can be constrained within the housing 110. Accordingly, the mechanical coupling between the shaft 102 and the carrier 104 can be selected such that the linear motion range (ΔY) corresponding to the rotational range (Δα) of the shaft 102 is less than or equal to the mechanically constrained range of the carrier 104 and/or the magnet 106.

FIG. 2B shows an example coordinate system with "Y" representing the linear motion direction. It will be understood that the shown coordinate system is simply for the purpose of description and is not intended to limit the scope of the present disclosure in any manner.

Figure 3:
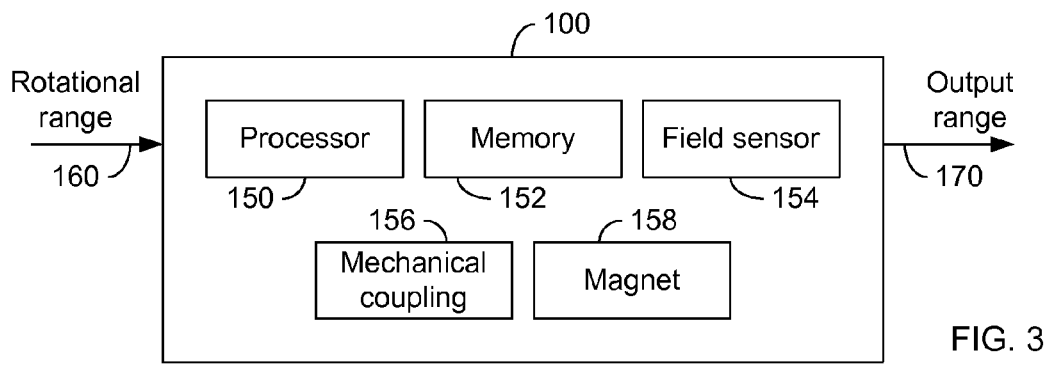
FIG. 3 schematically shows that in certain embodiments, the rotational position sensor can include a processor and a memory to facilitate a programmable capability.

FIG. 3 shows that in certain embodiments, the rotational position sensor 100 can include various functional components. As described in reference to FIGS. 1 and 2, a mechanical coupling component 156 can transform rotational movement of the shaft (102) into a linear movement of the magnet (106) that can be represented as a magnet component 158. Positions of the magnet can be detected by the sensor element (108) that can be represented as a field sensor component 154.

In certain embodiments, the rotational position sensor 100 can also include a processor component 150 and a memory component 152 that can provide one or more functionalities as described herein. In certain embodiments, the processor 150 and the memory 152 can provide programmable functionality with respect to, for example, calibration and operating dynamic range of the sensor 100.

As an example, such programmability can facilitate selection of a desired rotational range (depicted as an input 160); and a rotational position of the shaft within such a range can be provided with a unique output value that is within a selected output range (depicted as an output 170). Additional details about such programmability are described herein.

Figure 4A:
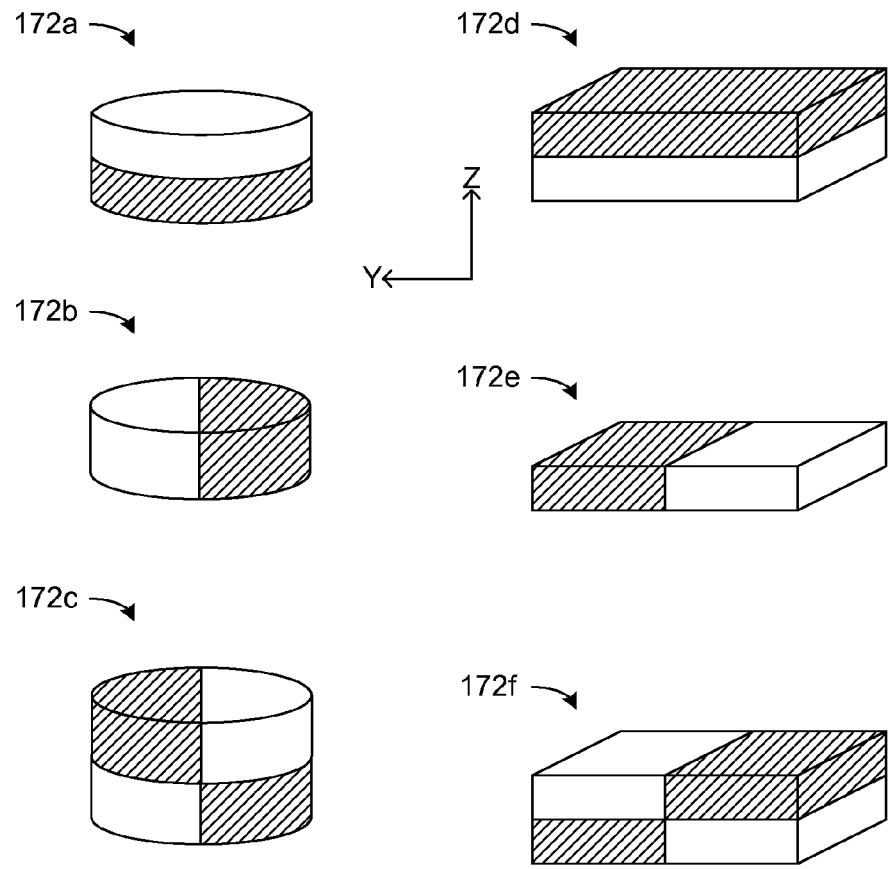
FIG. 4A shows non-limiting examples of magnet configurations that can be utilized for the magnet of FIG. 1.

In certain embodiments, the magnet 106 depicted in FIGS. 1 and 2 can be configured in a number of ways. FIG. 4A depicts non-limiting examples of magnets that can be utilized in one or more embodiments of the rotational position sensor 100 as described herein. For example, the magnet can be a cylindrical shaped magnet (172a, 172b, 172c) or some other shaped magnet such as a box shaped magnet (172d, 172e, 172f). For the purpose of description of FIG. 4A, it will be understood that the slanted line fill pattern and the unfilled pattern indicate two poles of a dipole magnet. For example, the unfilled pattern can represent a north pole, and the slanted line fill pattern can represent a south pole.

In certain embodiments, the magnet 106 can be a permanent magnet. In certain embodiments, the permanent magnet can be a single dipole magnet or a combination or two or more dipole magnets.

For the purpose of description herein, a permanent magnet can include a magnet that includes a material that is magnetized and generates its own substantially persistent magnetic field. Such materials can include ferromagnetic materials such as iron, nickel, cobalt, and certain rare earth metals and some of their alloys.

For the purpose of description herein, it will be understood that a single dipole magnet has what are generally referred to as "north" and "south" poles, such that magnetic field lines are designated as going from the north pole to the south pole. For the single dipole magnet, its magnetization axis is generally understood to be a line extending through the magnet's north and south poles.

For example, the example magnet 172a is a cylindrical shaped magnet having north and south poles along the cylinder's axis. In such a configuration, the magnetization axis can be approximately coaxial with the cylindrical axis.

In another example of a cylindrical shaped magnet 172b, the north and south poles are depicted as being azimuthal halves of the cylinder. Accordingly, its magnetization axis is likely approximately perpendicular to the cylindrical axis. In shaped magnets having two or more dipole magnets (e.g., 172c, 172f), a magnetization axis may or may not form relatively simple orientation with respect to the shape's axis. For the purpose of description herein, it will be understood that magnetization axis can include an overall characteristic of a magnet, as well as a local characteristic of a magnetic field pattern generated by a magnet.

In certain examples described herein, magnetization axis is depicted as being generally perpendicular to the longitudinal motion of the magnet. However, it will be understood that other orientations of the magnetization axis are also possible. For example, magnet configurations 172b, 172c, 172e, and 172f can yield non-perpendicular magnetization axes when positioned as shown and moved along the indicated Y direction.

Figure 4B:
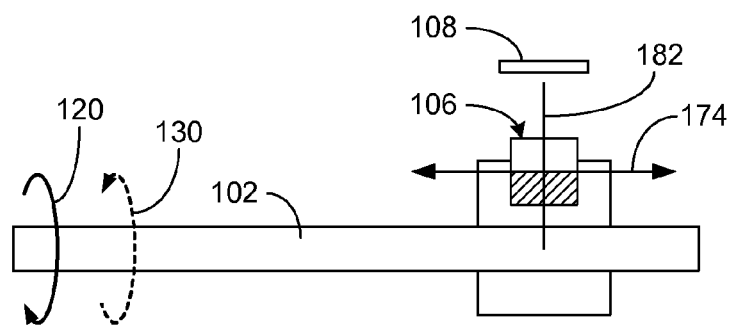
FIG. 4B shows that in certain embodiments, the magnet can be a permanent dipole magnet positioned so that its magnetization axis is substantially perpendicular to the direction of the magnet's longitudinal motion.

FIG. 4B shows that in certain embodiments, the magnet 106 can be a dipole magnet positioned so that its magnetization axis 182 is substantially perpendicular to the direction of the magnet's longitudinal motion (depicted as arrow 174). For example, a cylindrical permanent magnet can be positioned so that its north and south poles are generally form the magnetization axis 182 that is substantially perpendicular to the longitudinal direction. As described herein, such longitudinal motion can result from rotation (120, 130) of the shaft 102 to which the magnet 106 is coupled. As also described herein, such longitudinal motion can move the magnet 106 relative to the sensor element 108 so as to facilitate determination of the magnet's longitudinal position relative to the sensor element 108.

In the example shown in FIG. 4B, the magnetization axis 182 can be generally similar to the axis of the magnet's shape (e.g., a cylinder). An example shown in FIG. 4C depicts a more localized view of magnetic field lines 180 generated by the magnet 106. Although the magnet 106 depicted in FIGS. 4C-7B are described in the context of a dipole magnet such as that shown in FIG. 4B, it will be understood that a similar magnetic field pattern can be generated or approximated by other magnet configurations having one or more dipole magnets. Thus, the magnetization axis 182 depicted in FIG. 4C can be representative of a local field affecting the sensor element 108.

In certain embodiments, the magnet 106 can be oriented such that its magnetization axis 182 representative of magnetic field at or about the sensor element 108 is generally perpendicular to the translational motion direction. In certain embodiments, the magnet 106 can be positioned so that the magnetization axis and the longitudinal axis generally define a plane that extends through an approximate center of the sensor element 108. In the context of the example coordinate system shown in FIG. 2B, the magnetization axis of the magnet 106 is generally along the Z axis in such embodiments. As described herein, such a configuration can provide features that are desirable.

FIG. 4C shows a more detailed view of a pole section of the magnet 106 relative to a side view of the sensor element 108. As shown, the magnetization axis 182 of the magnet 106 is depicted as being generally perpendicular to a plane defined by the sensor element 108.

Also shown are depictions of magnetic field lines 180 generated by the magnet 106. Assuming that the shown pole is a magnetic north pole, several field vectors are depicted in their decomposed ($B_Z$ and $B_Y$) forms (in the example coordinate system shown in FIG. 2B). As shown, field vectors 184 are generally symmetrical about the magnetization axis 182. Thus, the Z component of the field vector 184a is generally same in direction and magnitude as the Z component of the field vector 184d; and the Y component of the vector 184a is opposite in direction but generally same in magnitude as the Y component of the vector 184d. Similarly, the field vector 184b is generally a mirror image of the field vector 184c.

Based on the foregoing, average contribution of $B_Z$ is generally symmetric about some Y=0 as the magnet moves along the Y direction. Such symmetry is depicted as a $B_Z$ curve 190 in FIG. 5A. If the $B_Z$ component alone is measured by the sensor element 108, then there may or may not be ambiguity in magnet's position determination. For example, if the sensor element 108 and the magnet 106 are configured so that the magnet's motion is limited to one longitudinal side of the sensor element, the measured $B_Z$ component may be that of the Y>0 portion of the curve 190. In such a situation, there is likely no ambiguity in position determination based on the $B_Z$ component alone. However, if the sensor element 108 and the magnet 106 are configured so that the magnet's motion is allowed on both longitudinal sides of the sensor element, there can be an ambiguity in position determination that can be resolved.

In certain embodiments, magnetic field component along the translational motion direction ($B_Y$) can be measured simultaneously with the $B_Z$ component. Based on the example field representations 184 in FIG. 4C, the average contribution of $B_Y$ is generally asymmetric about some Y=0 as the magnet moves along the Y direction. Such asymmetry is depicted as a $B_Y$ curve 192 in FIG. 5B. Thus, the $B_Z$ ambiguity about Y=0 can be resolved by the asymmetry where $B_Y>0$ when Y>0 and $B_Y<0$ when Y<0.

In certain embodiments, it is possible to characterize the magnet's position along the Y direction based on the values of $B_Y$ component. However, utilizing the $B_Z$ component can be advantageous for a number of reasons. For example, detection of perpendicular component (relative to a magnetic field detection plane) is usually preferred over other components. In another example, the $B_Y$ curve 192 passes through a zero value at Y=0. Thus, at Y=0 and near Y=0, the $B_Y$ component has a value of zero or a value that is relatively small. Consequently, signal-to-noise ratio can be unacceptably low at what can be a mid-portion of the magnet's travel along the Y direction. In contrast, the $B_Z$ component has a maximum value at generally the same mid-portion of the magnet's travel along the y direction. Further, the maximum value of the $B_Z$ component can be typically significantly higher than the maximum value of the $B_Y$ component.

In addition to the foregoing features, there are other considerations for which the example magnet orientation of FIG. 4C can provide advantageous features. Such features can include relative insensitivity of the output (170 in FIG. 3) to various deviations in the magnet's orientation.

FIGS. 6A and 6B show the magnet 106 mounted on the carrier 104, and viewed along the magnetization axis. For such an example configuration, mounting can be achieved by the carrier 104 defining a recess (262 in FIG. 8) shaped similar to at least a portion of the magnet 106 (e.g., cylindrical shaped recess to receive cylindrical shaped magnet). In the context of such an example mounting configuration, FIGS. 6A and 6B show that due to the generally symmetric magnetic field, azimuthal orientation of the magnet 106 with respect to the magnetization axis (parallel to Z-axis in FIGS. 6A and 6B) generally does not affect the magnetic field 180 reaching the sensor element (108 in FIG. 4C). For the purpose of showing different azimuthal orientations, an indicator 200 is depicted on the magnet 106.

In certain embodiments, the magnet 106 is preferably mounted on the carrier 104 so that the magnet's magnetization axis is substantially along the Z-axis, and thus perpendicular to both X and Y axes. Due to various reasons, however, the magnetization axis may deviate from the Z-axis; and examples of such deviations are depicted in FIGS. 7A and 7B.

In FIG. 7A, a side view of the magnet-carrier assembly shows that the mounted magnet's axis 182 deviates from the Z-axis (indicated as 210) to result in the magnet 106 being tilted along the Y direction. In FIG. 7B, an end view of the magnet-carrier assembly shows that the mounted magnet's axis 182 deviates from the Z-axis (indicated as 210) to result in the magnet 106 being tilted along the X direction. In certain situations, the magnet 106 can be tilted so as to yield a combination of X and Y tilts of FIGS. 7A and 7B.

If the magnet 106 is tilted in the foregoing manner, the magnetic field patterns may deviate from the ideal pattern depicted in FIGS. 5A and 5B. Because the $B_Z$ component is relatively large compared to the $B_Y$ component, and because the deviation angle (relative to Z-axis) is relatively small, the net effect on $B_Z$ can be relatively small. Further, even if there are significant deviations in $B_Z$ and/or $B_Y$ components, programmability in certain embodiments as described herein can account for such deviations and thus make the output even less sensitive to magnet orientation.

Figure 8:
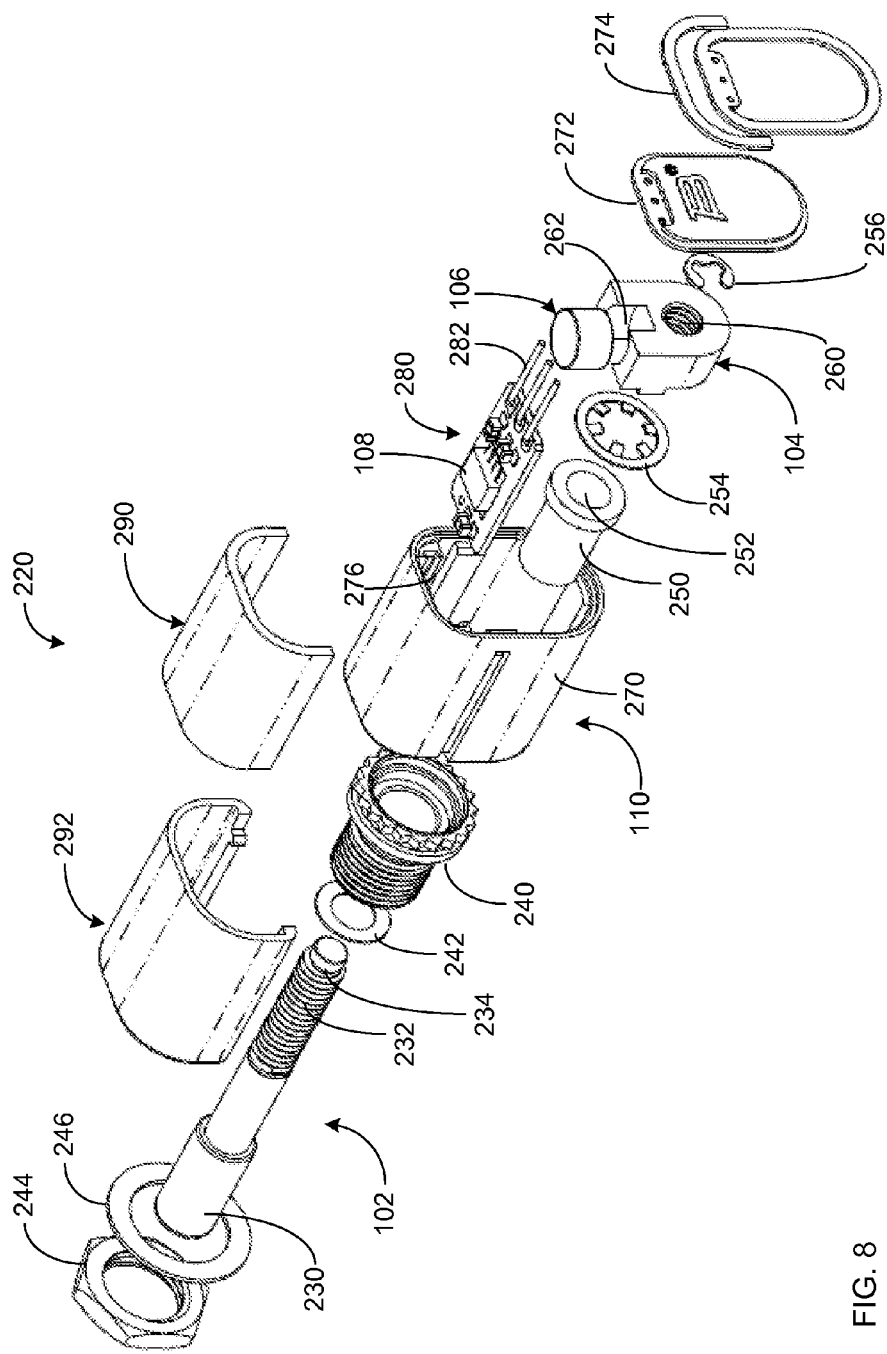
FIG. 8 show an exploded view of an example embodiment of the rotational position sensor of FIG. 1.
Figure 9A:
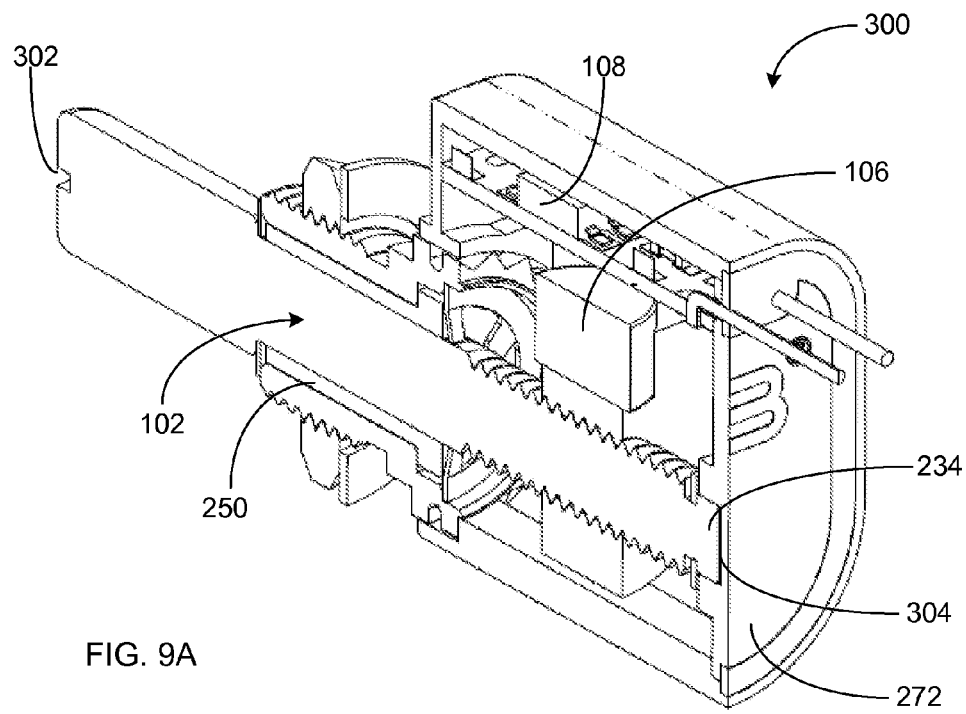
FIG. 9A shows a cutaway perspective view of the rotational position sensor of FIG. 8.
Figure 9B:
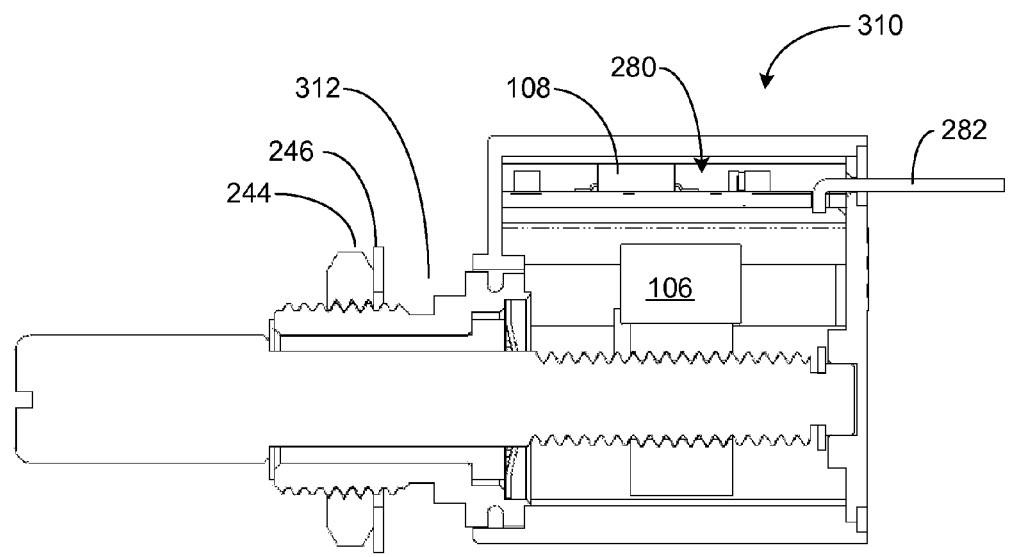
FIG. 9B shows a cutaway side view of the rotational position sensor of FIG. 8.
Figure 10:
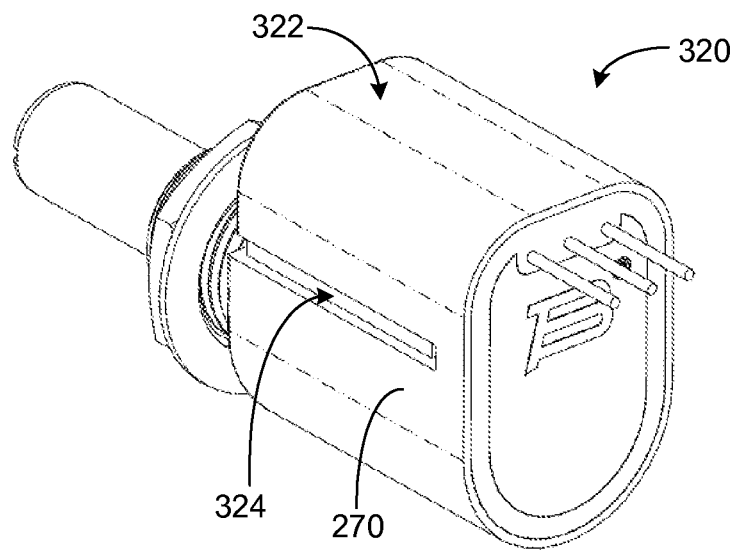
FIG. 10 shows an assembled perspective view of the rotational position sensor of FIG. 8.

FIGS. 8-10 show various views of an example configuration of the rotational position sensor 100. FIG. 8 shows an exploded view 220; FIG. 9A shows an assembled cutaway perspective view 300; FIG. 9B shows an assembled cutaway side view 310; and FIG. 10 shows an assembled perspective view 320.

As shown, the shaft 102 includes a first end 230 configured to facilitate transfer of torque to the shaft 102 from an external component (not shown). In the example shown, the first end 230 defines a slot 302 (FIG. 9A) for such a purpose. It will be understood that a number of different configurations are possible.

The shaft 102 also includes a second end 232 configured to couple with the carrier 104. In the example shown, the second end 232 of the shaft 102 and a matching aperture 260 of the carrier 104 define matching thread patterns that facilitate translational motion of the carrier 104 in response to rotation of the shaft 102.

The second end 232 of the shaft 102 is shown to be dimensioned to receive a retaining clip 256 for limiting travel of the carrier 104. The second end 232 is also shown to include a tip 234 (FIG. 9A) dimensioned to be received by a similarly dimensioned recess 304 defined by an end cap 272 so as to constrain the second end 232 of the shaft.

In the example shown, a portion between the first and second ends (230, 232) of the shaft 102 is dimensioned to be supported within an aperture 252 defined by a sleeve 250. The sleeve 250 in turn is dimensioned to be secured to the housing 110 via a bushing 240 and a washer 254. Thus, supports of the shaft 102 by the sleeve 250 and the recess 304 of the end cap 274 allow the shaft to rotate with relative precision with respect to the housing 110. Further, longitudinal motion of the shaft 102 with respect to the bushing 240 (and thus the housing 110) is inhibited by a retaining washer 242 and the washer 254.

In certain embodiments, the bushing 240 can include external screw threads that mate with a mounting nut 244 to allow mounting of the sensor assembly. As shown in FIG. 9B, the thread pattern on the bushing can be selected to provide an adjustable space 312 between the mounting nut 244 and the housing to facilitate mounting to various dimensioned structures such as plates. A washer 246 can further facilitate such mounting.

In certain situations, it may be desirable to have the overall shape of the sensor assembly to be in certain form. For example, a design may call for a rounded form of housing (when viewed longitudinally). More particularly, a design preference may call for a circular shaped housing with respect to the longitudinal axis of the shaft. However, if the interior of the housing is circularly shaped and the carrier is shaped circularly also with the shaft extending through the carrier's center, the carrier's rotational tendency (in response to the shaft rotation) may not be inhibited in absence of some rotation-inhibiting features.

Thus, in certain embodiments, a side wall 207 of the housing 110 can be shaped in a "U" shape (when viewed longitudinally), and the carrier can be shaped accordingly. In certain embodiments, the curved portion of the "U" can be substantially semi-circular in shape, and the longitudinal axis of the shaft 102 can be positioned at the center of a circle that would be formed by two of such semi-circles. Such a configuration can accommodate at least some of the aforementioned circular design preference. In certain embodiments, the sides of the "U" can extend upward so as to inhibit the rotational tendency of the carrier 104.

In certain embodiments, the top portion of the "U" shaped side wall 207 can be generally flat so as to accommodate a circuit assembly 280 that can be formed on a flat circuit board. In the example shown, the circuit assembly 280 can be formed as a substantially complete unit on a printed circuit board that is dimensioned to slide into grooves 276 formed near the top portion of the side wall 270.

In certain embodiments, as shown in FIG. 8, the example carrier 104 can also have a "U" shape to fit into the side wall 270 and slide longitudinally therein in response to the rotation of the shaft 102. Similar to the side wall 270, the top portion of the carrier 104 can be generally flat so as to accommodate the flat shaped circuit assembly 280. The height of the carrier's "U" shape can be selected so as to allow mounting of the magnet 106 thereon (via the recess 262) at a desired Z distance (see the example coordinate system in FIG. 2B) from the sensing element 108.

As shown, the circuit assembly 280 can include one or more electrical contacts 282, and such contacts can be allowed to extend out of the housing 110 through appropriately formed holes on the end cap 272. In certain embodiments, a sealing member 274 can be provided so as to facilitate assembly of the rotational sensor device, as well as provide at least some sealing functionality for various components inside of the housing 110. Such sealing member can include a gasket, an epoxy, or some combination thereof.

FIG. 10 shows an assembled perspective view 320 of the rotational position sensor. One can see that the example configurations and arrangements of various components as described herein allow the rotational position sensor to provide magnetic field sensing functionality in a relatively simple and compact packaging while satisfying certain design criteria.

Figure 11A:
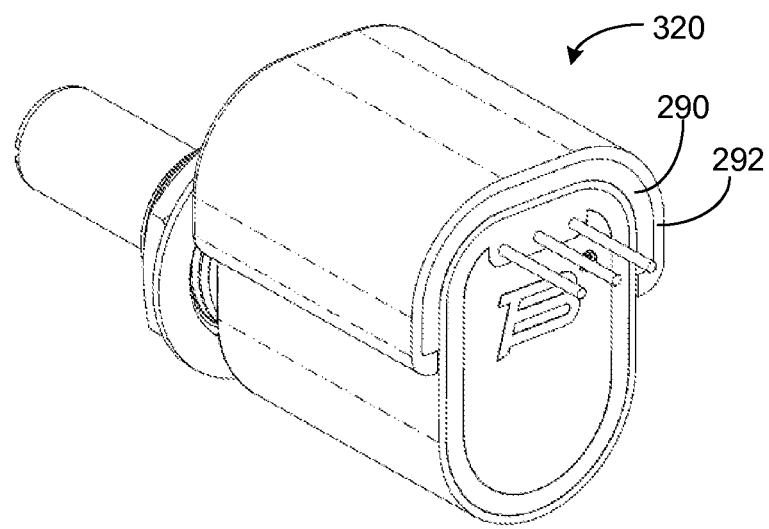
FIG. 11A shows that in certain embodiments, a shield can be provided for the rotational position sensor of FIG. 10.

In certain embodiments, as shown in FIGS. 10 and 11A, the side wall 270 of the housing can include slots 324 dimensioned to facilitate easy mounting and removal of a shield 290. In certain situations, the rotational position sensor can be subjected to external electric and/or magnetic fields, and/or radiation.

Because the sensor element 108 operates by sensing magnetic fields, it is desirable to limit magnetic fields to those from the magnet 106 for accurate measurements. Thus, in certain embodiments, the shield 290 can be formed of material that has relatively high magnetic permeability. For example, metal alloys such as Permalloys and Mu-metals can be used to form the shield 290.

As shown, the shield 290 can be shaped to substantially conform to the upper portion 322 of the side wall 270. In certain embodiments, a cover 292 can be dimensioned to have its edges slide into the slots 324 and sandwich the shield 290 between the cover 292 and the upper portion 322 of the side wall 270. In certain embodiments, the cover 292 can be formed relatively easily from plastic to accommodate its shape that is more complex than the shield 290 (to fit into the slots 324).

In certain operating conditions, the rotational position sensor may be subjected to radiation such as X-ray, gamma radiation, energetic charged particles, neutrons, and/or other ionizing radiations. Such radiation can have detrimental effects on one or more parts of the rotational sensor, especially upon prolonged exposure. For example, in embodiments where the sensor element 108 is formed from or based on semiconductor materials and/or components, exposure to radiation can degrade the sensing performance.

Figure 11B:
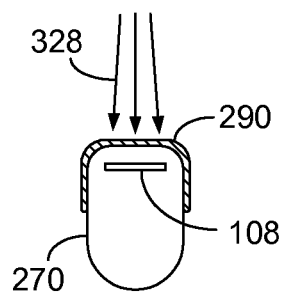
FIG. 11B shows an example situation where an internal component such as the sensing element of the rotational position sensor can be shielded by the example shield of FIG. 11A.

FIG. 11B shows that in certain embodiments, the example shield 290 can provide effective shielding of the sensor element 108 from radiation 328 without having to fully enclose the housing 270. In common situations where the general direction of radiation 328 is known, the rotational position sensor can be oriented so that the shield 290 covers the sensor element 108 and/or other component(s) from the radiation so as to reduce their exposure.

For example, suppose that a rotational position sensor is being used to monitor the position of a movable patient platform for a radiation based treatment or imaging device. Many of such platforms are moved via jackscrews, and monitoring of the rotation of such jackscrews (by the rotational position sensor) can provide information about the platform position. In such controlled clinical situations, direction and amount of radiation associated with the treatment or imaging device are generally well known. Thus, the rotational position sensor (with a shield) can be oriented so as to provide shielding effect from the radiation.

In certain embodiments, the radiation shield 290 can be formed from and dimensioned to provide shielding effect from particular radiation by attenuating intensity of such radiation. Materials such as lead having heavy nuclei can be suitable for shielding X-ray and gamma radiation; whereas low density materials such as plastic or acrylic glass can be suitable for energetic electrons. Other materials for other types of radiations are also possible.

As described herein, use of such easily installable and removable shields can provide an advantageous feature in the context of radiation safety. Because the internal components are shielded from performance degrading radiation, the rotational position sensor can have a longer service life. In the event that the shield needs to be replaced due to its own activated radiation from prolonged exposure, the shield can be replaced relatively easily; and the radioactive shield can be stored or disposed of safely easily due to its relatively small size and simple form.

FIGS. 12A-12F show various non-limiting examples of the housing 270 that can be used as part of the rotational position sensor. Also shown are non-limiting example configurations of the shield 290 having one or more features as described herein.

Figure 12A:
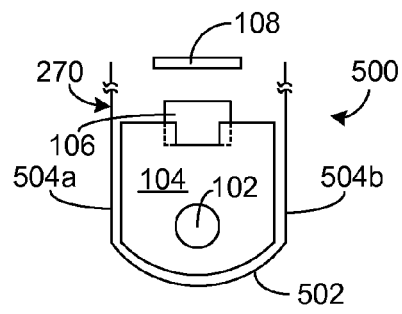
FIGS. 12A-12F show various non-limiting examples of housing shapes and shield shapes that can be implemented.

FIG. 12A shows an example housing configuration 500, where the housing 270 includes a curved wall 502, and first and second walls 504a, 504b that extend from the curved wall 502 so as to form a "U" shaped wall. Examples of advantageous features that can be provided by U-shaped walls are described herein in reference to FIGS. 8 and 9.

FIG. 12A further shows that in certain embodiments, the carrier 104 can be shaped to generally conform to and move longitudinally relative to the interior of the U-shaped wall. Various features of the carrier 104 (e.g., coupling with the shaft 102, and holding of the magnet 106 so as to allow longitudinal movement relative to the sensor element 108) are described herein.

Figure 12B:
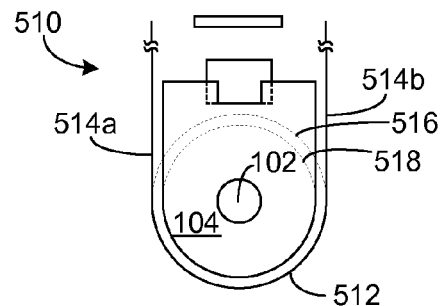

FIG. 12B shows that in certain embodiments, the curved wall can be defined by a portion of a circle 516. For example, in an example housing configuration 510, the curved wall can be defined by a semi-circle 512 that is part of the shown circle 516. In certain embodiments, the portion of the circle defining the curved wall can be an arc that extends more or less than approximately 180 degrees associated with the semi-circle. In the example shown in FIG. 12B, the center of the circle 516 that defines the semi-circle wall 512 can be substantially concentric with the center of the shaft 102.

As further shown in FIG. 12B, first and second walls 514a, 514b can extend from the semi-circular wall 512 so as to form a U-shaped wall of the housing 270. In certain embodiments, the carrier 104 can be formed so as to substantially conform to the interior of the curved portion of the U-shaped wall. For example, the curved portion of the carrier 104 can be defined by a semicircle that is part of the depicted circle 518 so as to conform to the example semi-circle wall 512.

Figure 12C:
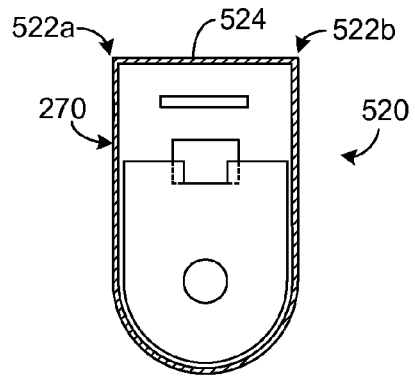
Figure 12D:
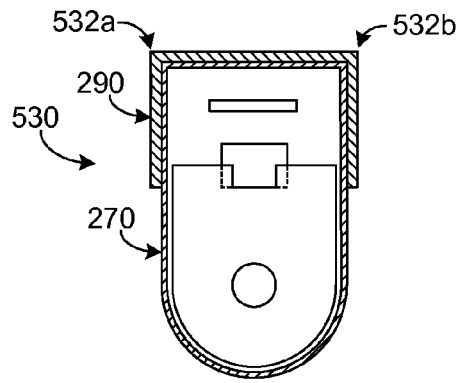
Figure 12E:
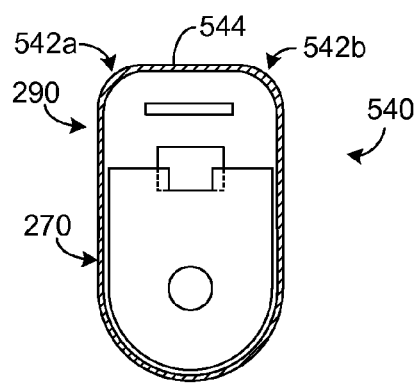

FIGS. 12C and 12E show that the top portion of the U-shaped housing can be configured in a number of different ways. An example configuration 520 of FIG. 12C shows that a cap wall 524 can be coupled with the side walls (e.g., 514a, 514b in FIG. 12B) so as to form substantially square corners indicated as 522a and 522b. Another example configuration 540 of FIG. 12E shows that a cap wall 544 can be coupled with the side walls (e.g., 514a, 514b in FIG. 12B) so as to form rounded corners indicated as 542a and 542b.

Figure 12F:
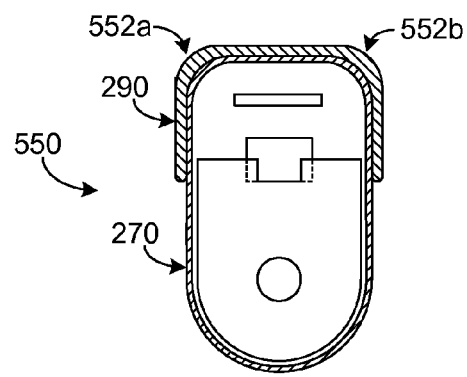

FIGS. 12D and 12F show that the shield 290 having one or more functionalities as described herein can be shaped in a number of ways. An example configuration 530 of FIG. 12D shows that the shield 290 can be shaped to generally conform to the example square-cornered (522a, 522b) top portion of the housing of FIG. 12C, such that the shield 290 includes generally square corners indicated as 532a and 532b. Another example configuration 550 of FIG. 12F shows that the shield 290 can be shaped to generally conform to the example rounded-cornered (542a, 542b) top portion of the housing of FIG. 12E, such that the shield 290 includes rounded corners indicated as 552a and 552b.

For the purpose of description of FIGS. 12A-12F, it will be understood that terms such as "top" and "side" are used in the context of relative positions of different parts associated with the U-shaped wall, and should not be construed to mean that the rotational position sensor as a whole needs to be positioned as such. For clarity, it will be understood that for embodiments of the rotational position sensor having the U-shaped housing, the sensor can be oriented in any manner (e.g., "U" opening up, down, sideway, or any combination thereof) as needed or desired.

Figure 13:
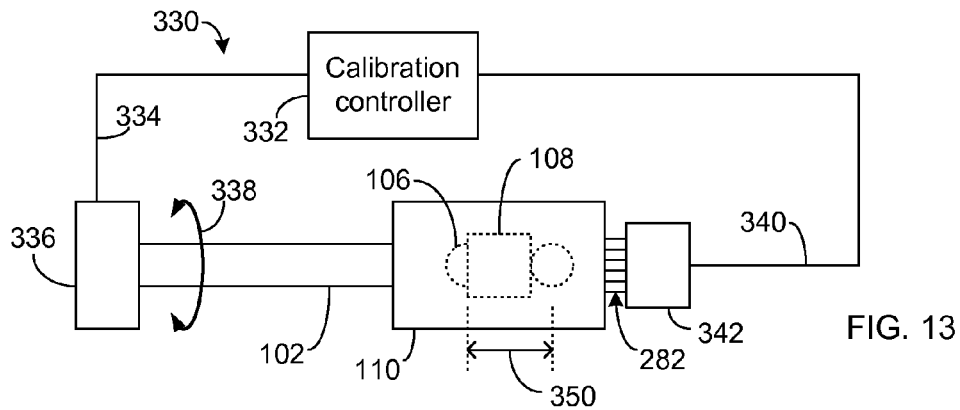
FIG. 13 shows an example configuration for calibrating the rotational position sensor.
Figure 14:
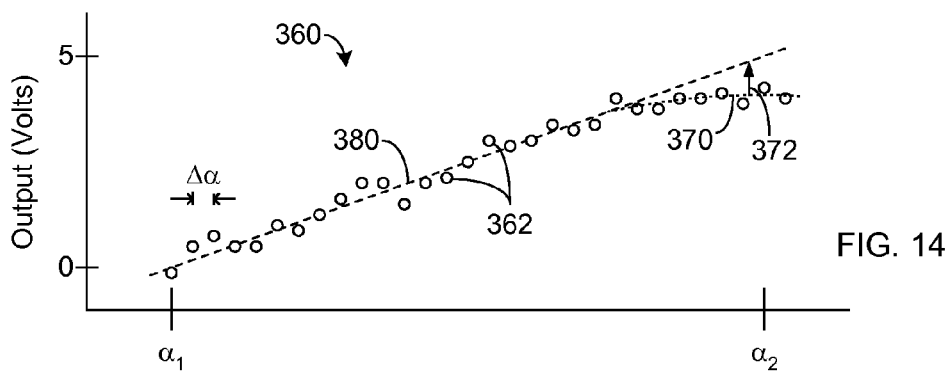
FIG. 14 shows an example of how calibration data can be represented and stored for use during operation of the rotational position sensor.

As described herein in reference to FIG. 3, certain embodiments of the rotational position sensor 100 can include a programmable functionality with respect to, for example, calibration and operating dynamic range of the sensor 100. FIGS. 13 and 14 show examples of such programmability.

In FIG. 13, a calibration system 330 can include a controller 332 in communication (depicted as line 334) with an actuator 336 so as to allow controlled rotation (arrow 338) of the shaft 102. In response to the controlled rotations (e.g., in steps), the magnet 106 is depicted as moving relative to the sensor element 108 in a selected longitudinal motion range (depicted as 350) within the housing 110. At each of the controlled magnet positions, an output signal can be collected through the contacts 282 via a connector 342, and such signal can be provided (line 340) to the controller 332 for processing.

The calibration data 360 obtained in the foregoing manner can be represented in a number of ways. As shown in an example representation 360 in FIG. 14, a relationship between an output such as voltage and an input such as an angular position a can be obtained. For a plurality of calibration data points 362 obtained at a number of angular positions (e.g., obtained in increments of $\Delta\alpha$), a curve such as a linear line 380 can be fit to represent a relationship between the output voltage and the input angular position. Fitting of such representative curve can be achieved in a number of ways that are generally known.

In certain situations, some portion(s) of the calibration data points may deviate systematically from a representative curve. For example, data points near the upper limit of the angular position $\alpha$ are depicted as deviating from the linear line 380 (representative of the main portion of the angular range). Such deviation can occur due to a number of reasons. For the purpose of description, the systematic deviation is shown as being represented by a deviation curve 370.

In certain embodiments, one or more corrections can be made so as to adjust an output so as to yield a desired output representation. For example, the systematic deviation 370 can be adjusted (arrow 372) such that the output voltage can be represented as a substantially linear relationship within a defined range of the angular position $\alpha$.

In certain embodiments, information about the calibrated input-to-output relationship can be stored so as to be retrievable during operation of the rotational position sensor 100. For example, such information can be stored in the memory component 150 of FIG. 3 in one of a number of formats, including, a lookup table, one or more parameters (e.g., slope and intercept parameters if linear relationship is used) for an algorithm representative of the relationship, etc.

Figure 15:
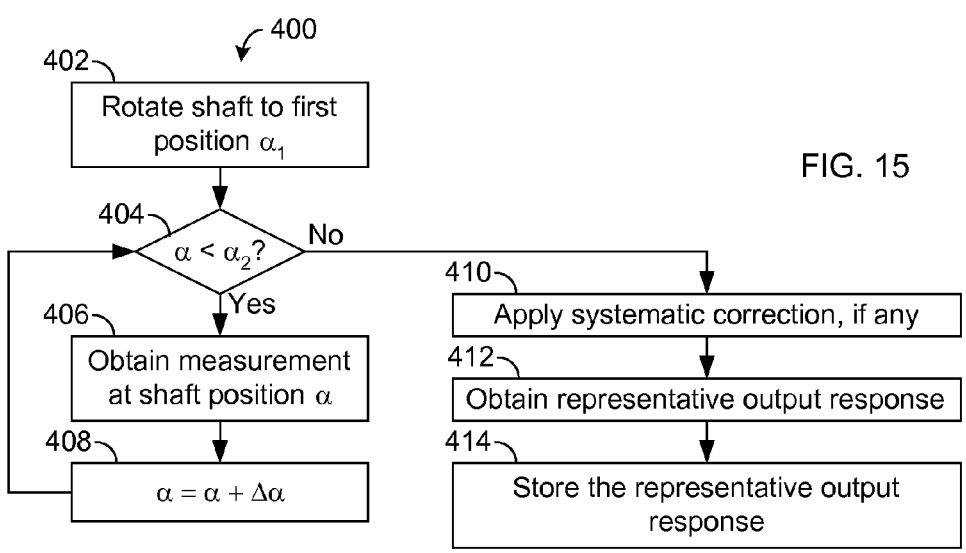
FIG. 15 shows an example calibration process that can be implemented.

FIG. 15 shows an example process 400 that can be implemented to achieve one or more features of the calibration process described in reference to FIGS. 13 and 14. In a process block 402, the shaft of the angular position sensor 100 can be rotated to a first position ($\alpha_1$) representative of a first limit (e.g., lower limit) of a desired range of rotational motion. The process 400 then can enter an iterative sequence where measurements are taken at incremental steps. Thus, in a decision block 404, the process 400 determines whether the current angular position $\alpha$ is less than a second position ($\alpha_2$) representative of a second limit (e.g., upper limit) of the desired range of rotational motion. If the answer is "Yes," the process 400 continues with another iteration of measurement. In a process block 406, a calibration measurement can be obtained at the current shaft position $\alpha$. In a process block 408, the shaft position can be incrementally changed by $\Delta\alpha$, and the process 400 can perform the test of the decision block 404 with the updated angular position.

If the answer in the decision block 404 is "No," a systematic correction (if any) can optionally be applied in a process block 410. In a process block 412, a representative output response (e.g., a linear output response) can be obtained. In a process block 414, information about the representative output response can be stored so as to allow retrieval and use during operation of the angular position sensor 100.

In certain embodiments, the calibration feature can include a locking feature to inhibit unauthorized calibration and/or altering of the information about the output response. In certain situations, such locking can occur after a calibration process performed at an authorized facility such as a fabrication facility.

In certain situations, it may be desirable to provide at least some capability for adjustments, customizations, and the like after locking of the calibration feature and/or calibration information. In certain embodiments, the calibration feature can further include a key (e.g., an electronic key) that allows an authorized party to unlock at least some of such functionalities. Locking, unlocking, and related operations for the foregoing can be achieved in known manners.

In the foregoing description in reference to FIGS. 13-15, a linear relationship between an output and an input is described as being one of a number of possible relationships. In certain embodiments, such linear relationship can arise from a translational position of the magnet relative to the sensing element 108.

For example, in certain embodiments, the sensing element 108 can be an integrated circuit having capability to detect three components ($B_X$, $B_Y$, $B_Z$) of a magnetic field. Such an integrated circuit (IC) can include, for example, a Hall sensing monolithic sensor IC (model MLX90333) manufactured by Melexis Microelectronic Systems. Additional information about the example IC-based sensor element can be found in various documentations (including an application note) available at the manufacturer's website http://melexis.com.

For sensor elements having capability to detect two or more magnetic field components (such as the example Melexis sensor), a combination of $B_Z$ and a longitudinal component (e.g., $B_Y$) can yield a quantity that has an approximately linear relationship with longitudinal position of the magnet (relative to the sensor element). For example, $\theta = \arctan(B_Y/B_Z)$ ($\theta$ defined as shown in FIG. 4C) can yield an approximately linear response to longitudinal position of the magnet along the Y-axis.

In certain embodiments, such an approximately linear relationship between the example quantity $\theta$ and Y position can be extended to obtain an approximately linear relationship between the quantity $\theta$ and angular position ($\alpha$) of the shaft. Such extension of the relationship can be made readily, since the angular position ($\alpha$) of the shaft generally has a linear relationship with translational motion of the magnet carrier coupled via substantially uniform threads.

In certain embodiments, the example linear relationship between the angular position ($\alpha$) of the shaft and the magnetic field quantity $\theta$ can be provided with an amplitude parameter that allows selection of a desired output range. For example, the amplitude parameter can be selected so as to yield output values in a range between approximately 0 and 5 volts.

Although the foregoing example is described in the context of a generally linear property that can result from some combination of magnetic field components, it will be understood that such detected quantities do not necessarily need to be linear to begin with. For example, the example $B_Y$ and/or $B_Z$ components described in reference to FIG. 5 can be linearized by applying generally known techniques to calibration data points and/or representative curves.

In certain embodiments, an output of the rotational position sensor 100 does not even need to be a linear response to the input rotation. Preferably, however, each angular position of the shaft has a unique corresponding output.

In various examples described herein, an output of the rotational position sensor 100 is sometimes described as being a voltage. It will be understood, however, that the output can be in a number of different forms. The output can be in either digital or analog format, and include but not limited to signals based on pulse width modulation or serial protocol.

In certain embodiments, the output of the rotational position sensor 100 can be in a processed format. Such processing can include, for example, amplification and/or analog-to-digital conversion.

Figure 16:
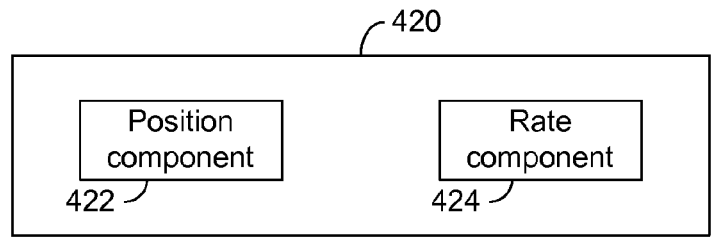
FIG. 16 shows that in certain embodiments, the rotational position sensor can include a rate component configured to calculate, for example, rotational rate based on sensed angular positions.

In certain embodiments, sensing of translational position of the magnet (and thus angular position of the shaft) can allow determination of a rate in which such a position changes. Thus, as depicted schematically in FIG. 16, a sensor system 420 can include a position determination component 422 having features as described herein, and optionally a rate component 424. In certain embodiments, the rate component can be configured to determine an average or an approximation of instantaneous rotational speed of the shaft by combining the position measurements as described herein with time information (e.g., sampling period). In certain embodiments, such a rate determination can be extended to estimation of angular acceleration of the shaft.

Figure 17A:
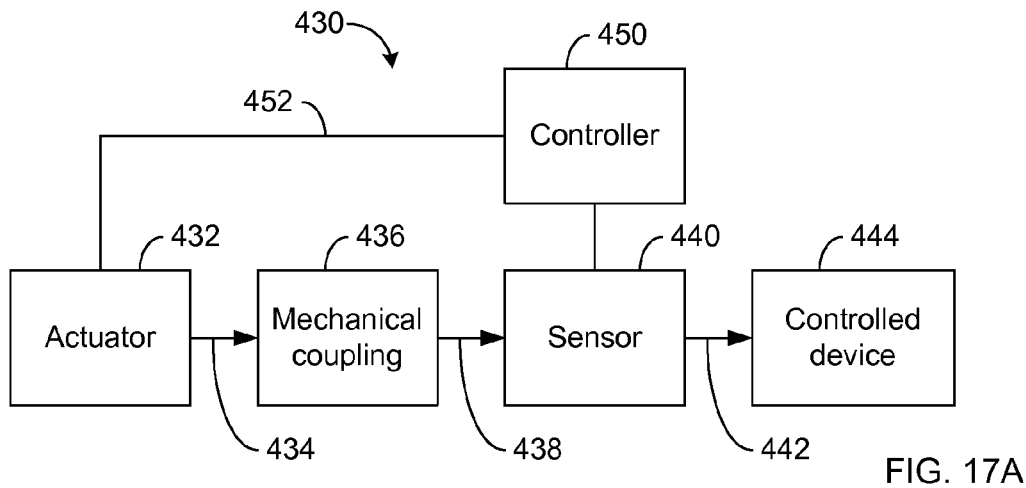
FIGS. 17A and 17B show non-limiting examples of feedback control systems that can be implemented utilizing the rotational position sensor.
Figure 17B:
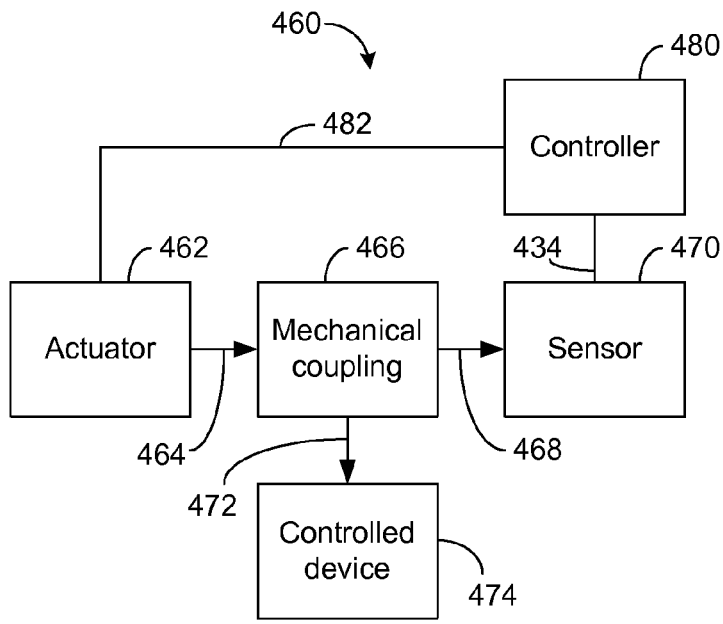

FIGS. 17A and 17B schematically depict non-limiting examples of systems where the rotational position sensor can be used. In one example system 430 shown in FIG. 17A, a rotational position sensor 440 can be disposed between an actuator 432 and a controlled device 444 being mechanically driven by the actuator 432 via a mechanical coupling 436. Thus, mechanical output (arrow 434) of the actuator 432 can be coupled (arrow 438) to the sensor 440 (via, for example, the shaft), and that mechanical actuation can continue through the sensor 440 and be transmitted (arrow 442) to the controlled device 444.

The sensor 440 can operate as described herein so as to facilitate determination of, for example, the rotational state of the mechanical coupling (e.g., rotational position of the shaft). As shown, the sensor 440 can be in communication with a controller 450 configured to control (line 452) the actuator 432 in response to the sensor's output. In certain embodiments, such sensing and controlling of the actuator 432 (and thus the controlled device 444) can be configured as a feedback control system.

FIG. 17B shows another example system 460 that can be a variation to the system of FIG. 17A. In the example configuration 460, a mechanical coupling component 466 can be configured to receive mechanical output (arrow 464) from an actuator 462 and provide separate mechanical outputs 472 and 468. The output 472 can be provided to a controlled device 474, and the output 468 can be provided to a sensor 470. Similar to the example system 430 of FIG. 17A, the sensor 470 can provide an output 434 to a controller 480 configured to control (line 482) the actuator 462. Again, such sensing and controlling of the actuator 462 can be configured as a feedback control system.

As described in reference to FIGS. 17A and 17B, the example configuration 430 can be considered to be an inline type monitoring system, and the example configuration 460 can be considered to be a parallel type monitoring system. Other monitoring and/or feedback configurations are also possible.

In one or more example embodiments, the functions, methods, algorithms, techniques, and components described herein may be implemented in hardware, software, firmware (e.g., including code segments), or any combination thereof. If implemented in software, the functions may be stored on or transmitted over as one or more instructions or code on a computer-readable medium. Tables, data structures, formulas, and so forth may be stored on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, one or more processing units at a transmitter and/or a receiver may be implemented within one or more computing devices including, but not limited to, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques described herein may be implemented with code segments (e.g., modules) that perform the functions described herein. The software codes may be stored in memory units and executed by processors. The memory unit may be implemented within the processor or external to the processor, in which case it can be communicatively coupled to the processor via various means as is known in the art. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. A device, comprising:
a shaft having a longitudinal axis;
a carrier coupled to the shaft such that a range of rotation of the shaft results in a range of linear motion of the carrier along the longitudinal axis;
a magnet having a magnetization axis and disposed on the carrier such that the rotation of the shaft causes the magnet to move with the carrier along the longitudinal axis, the magnet oriented such that the magnetization axis is substantially perpendicular to the longitudinal axis; and
a magnetic sensor disposed relative to the magnet and configured to sense a first flux density along the magnetization axis and a second flux density along a direction perpendicular to the magnetization axis resulting from the magnet and generate an output signal representative of a rotational position of the shaft within the range of rotation based on the sensed first flux density and the second flux density.

2. The device of claim 1, further comprising a housing configured such that at least a portion of the shaft is within the housing.

3. The device of claim 2, wherein the housing is further configured such that each of the carrier, the magnet, and the magnetic sensor is substantially within the housing.

4. The device of claim 1, wherein the range of rotation of the shaft is greater than 360 degrees.

5. The device of claim 1, wherein the carrier is coupled to the shaft via matching threads formed on the carrier and the shaft.

6. The device of claim 5, wherein the matching threads are selected to provide the range of linear motion resulting from the range of rotation.

7. The device of claim 1, wherein the magnetic sensor includes a Hall sensor assembly configured to measure the first flux density along the magnetization axis and the second flux density along the direction perpendicular to the magnetization axis.

8. The device of claim 7, wherein the direction perpendicular to the magnetization axis is substantially parallel to the longitudinal axis.

9. The device of claim 8, wherein the range of linear motion of the carrier includes both sides of the Hall sensor assembly such that the sensed first flux density has a maximum magnitude when the magnet is approximately aligned with the Hall sensor assembly.

10. The device of claim 9, wherein the maximum magnitude of the first flux density when the magnet's position is approximately at the middle of the range of linear motion of the carrier.

11. The device of claim 10, wherein the magnet's longitudinal position ambiguity resulting from the measured first flux density along the magnetization axis is resolved by directionality of the measured second flux density along the longitudinal axis, such that the output signal of the magnetic sensor is representative of a linear position of the magnet and thus the rotational position of the shaft within the range of rotation.

12. The device of claim 7, wherein the magnetic sensor further includes an analog-to-digital converter (ADC) such that the output signal includes a digital signal.

13. The device of claim 1, wherein the magnetic sensor is programmable so as to allow definition of an output range corresponding to a subset of the range of rotation of the shaft.

14. The device of claim 13, wherein the subset of the range of rotation includes a rotation of the shaft by M degrees.

15. The device of claim 13, wherein the output signal within the output range has an approximately linear relationship with the rotational position of the shaft within the subset of the range of rotation of the shaft.

16. The device of claim 14, wherein M is less than or equal to 360 degrees.

17. The device of claim 14, wherein M is greater than 360 degrees.

18. The device of claim 17, wherein M is approximately equal to N times 360 degrees, N being a positive integer greater than 1.

19. The device of claim 1, further comprising a shield configured to provide electromagnetic shielding functionality for the magnetic sensor.

20. The device of claim 19, wherein the shield includes a high magnetic permeability material.

* * * * *